United States Patent
Takiguchi

(10) Patent No.: US 8,545,109 B2
(45) Date of Patent: Oct. 1, 2013

(54) OPTICAL FIBER ADAPTOR AND LASER SYSTEM

(75) Inventor: Yoshiro Takiguchi, Kanagawa (JP)

(73) Assignee: Sony Corporation, Tokyo (JP)

(*) Notice: Subject to any disclaimer, the term of this patent is extended or adjusted under 35 U.S.C. 154(b) by 147 days.

(21) Appl. No.: 13/286,926

(22) Filed: Nov. 1, 2011

(65) Prior Publication Data

US 2012/0128307 A1   May 24, 2012

(30) Foreign Application Priority Data

Nov. 19, 2010   (JP) .................................. 2010-258552

(51) Int. Cl.
*G02B 6/36*   (2006.01)
(52) U.S. Cl.
USPC .......................................................... 385/88
(58) Field of Classification Search
USPC ....................................... 385/71–78, 88, 100
See application file for complete search history.

(56) References Cited

U.S. PATENT DOCUMENTS

| | | | |
|---|---|---|---|
| 6,695,489 B2* | 2/2004 | Nault | 385/78 |
| 7,717,625 B2* | 5/2010 | Margolin et al. | 385/71 |
| 7,806,599 B2* | 10/2010 | Margolin et al. | 385/75 |
| 8,047,727 B1* | 11/2011 | Barnes et al. | 385/72 |

FOREIGN PATENT DOCUMENTS

| | | |
|---|---|---|
| DE | 4231919 A1 | 4/1993 |
| JP | 2000-019351 | 1/2000 |
| JP | 4095715 | 3/2008 |
| WO | 2009/103714 A1 | 8/2009 |

OTHER PUBLICATIONS

European Search Report issued Sep. 12, 2012 for corresponding European Appln. No. 11008510.7.

\* cited by examiner

*Primary Examiner* — Ellen Kim
(74) *Attorney, Agent, or Firm* — K&L Gates LLP

(57) ABSTRACT

An optical fiber adaptor includes: an optical fiber adaptor body including an insertion hole in which to insert a ferrule of an optical fiber plug, and a mounting section to which to mount a lock nut of the optical fiber plug having the ferrule inserted in the insertion hole; a light-transmitting sleeve which is provided in the insertion hole and which surrounds the ferrule inserted in the insertion hole; a first detection section operable to optically detect, from the outer peripheral side of the sleeve, whether or not the ferrule is inserted in the insertion hole; and a second detection section operable to detect the position of the lock nut mounted to the mounting section.

5 Claims, 9 Drawing Sheets

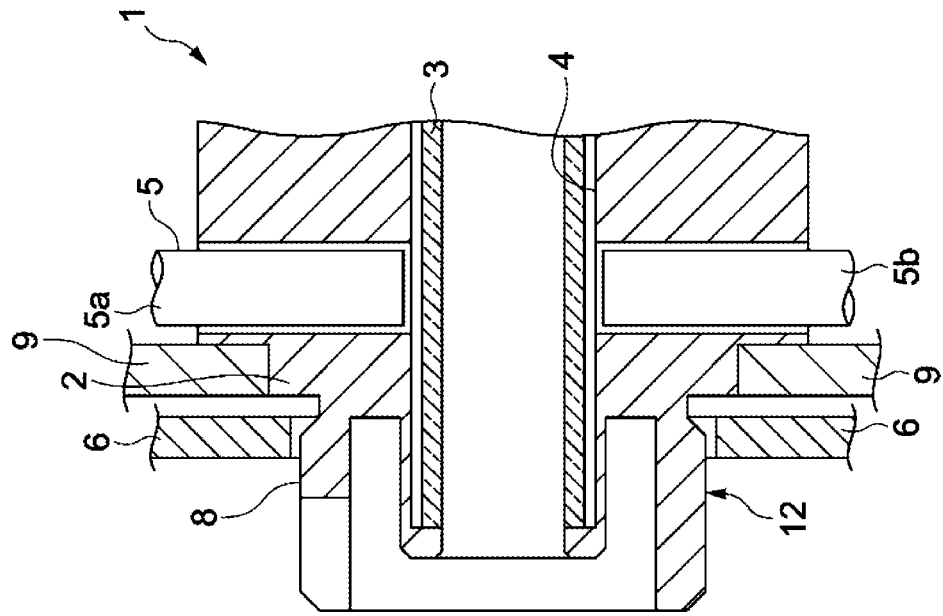
FIG. 1
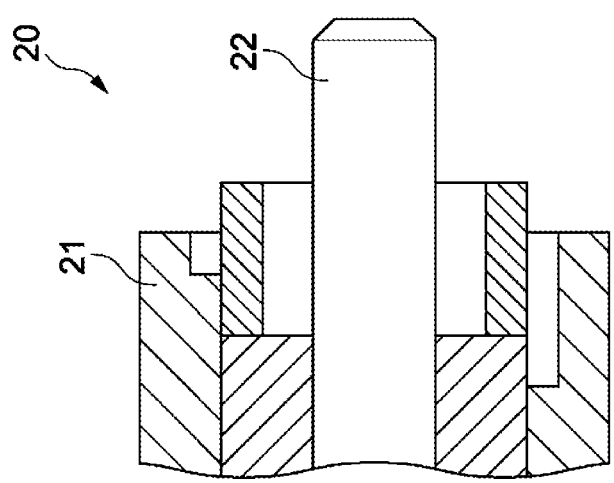

|  | | FERRULE | |
|---|---|---|---|
|  | | NOT INSERTED | INSERTED |
| LOCK NUT | NOT FASTENED | FC ADAPTOR EXPOSED (FC PLUG NOT INSERTED) | INSERTION UNDER WAY OR CLEANING UNDER WAY |
|  | FASTENED | DUST COVER MOUNTED | NORMAL CONNECTION |

OPTICAL FIBER ADAPTOR AND LASER SYSTEM

CROSS REFERENCES TO RELATED APPLICATIONS

The present application claims priority to Japanese Patent Application No. 2010-258552 filed on Nov. 19, 2010, the disclosure of which is incorporated herein by reference.

BACKGROUND

The present disclosure relates to a laser system for use in, for example, laser medical apparatus fields, and to an optical fiber adaptor for use in the laser system.

In recent years, applications of optical fiber have been rapidly spreading from the communications and instrumentation fields where low optical outputs are used toward the industrial laser processing machine and laser medical apparatus fields where high optical outputs are used. In the latter application fields where the optical outputs are high and the risk of exposure of the human body to laser beams is high, higher safety than in the past should be secured. Especially, a connector section for connection of optical fiber cables is attended by a high danger of exposure of the human body to the laser beam, since disengagement of a fiber due to unsatisfactory fixation or forgotten insertion of an optical fiber plug is liable to occur at the connector section. As one of the requirements concerning measures for the safety, there is a request for a function of detecting the mounted/demounted state of the optical fiber plug at the connector section of optical fiber.

Japanese Patent Laid-open No. 2000-19351 (paragraphs [0014]-[0027], FIGS. 2 and 3) discloses an example in which a pair of a light-emitting device and a light-receiving device for detecting the insertion of the plug is provided on the adaptor side as a mounted/demounted state detecting function. Japanese Patent No. 4095715 (paragraphs [0019]-[0026], FIGS. 1 to 4) discloses an example in which switches for detecting the insertion between an optical adaptor and an optical connector and the completion of the coupling between the optical adaptor and the optical connector are provided as a mounted/demounted state detecting function.

SUMMARY

In the field of the laser medical apparatuses, for example, not only the above-mentioned plug is frequently mounted and demounted but also there are other operating conditions such as a condition where a dust cover is attached to the adaptor and a condition where the adaptor is being cleaned. It has been found by the present inventors that in such operating conditions, an operator's misoperation may cause unwilling laser radiation, which leads to overheating of the cover or a cleaning implement, resulting in ignition or outgassing. This is a new problem to be solved.

Thus, there is a need for an optical fiber adaptor, and a laser system using the same, by which other conditions than the mounted/demounted state of an optical fiber plug can also be determined and safety can be enhanced more than in the past.

According to an embodiment of the present disclosure, there is provided an optical fiber adaptor which includes an optical fiber adaptor body, a light-transmitting sleeve, and first and second detection sections.

The optical adaptor body has an insertion hole in which to insert a ferrule of an optical fiber plug, and a mounting section to which to mount a lock nut of the optical fiber plug having the ferrule inserted in the insertion hole.

The light-transmitting sleeve is formed, for example, from zirconia, is provided in the insertion hole, and surrounds the ferrule inserted in the insertion hole.

The first detection section optically detects, from the outer peripheral side of the sleeve, whether or not the ferrule is inserted in the insertion hole.

The second detection section detects the position of the lock nut mounted to the mounting section.

In the present disclosure, when it is detected by the first detection section that the ferrule is not inserted and it is detected by the second detection section that the lock nut is not fastened tight, it can be determined that the plug is not inserted and the adaptor is exposed. When it is detected by the first detection section that the ferrule is inserted and it is detected by the second detection section that the lock nut is not fastened tight, it can be determined that insertion of the ferrule is under way or cleaning of the adaptor is under way. When it is detected by the first detection section that the ferrule is not inserted and it is detected by the second detection section that the lock nut is fastened tight, it can be determined that there exists a condition where the dust cover is mounted. When it is detected by the first detection section that the ferrule is inserted and it is detected by the second detection section that the lock nut is fastened tight, it is determined that the ferrule is in normal connection. Thus, according to the embodiment of the present disclosure, other conditions than the mounted/demounted state of the plug can be determined, and safety can be enhanced more than by the related art.

In the optical fiber adaptor according to the embodiment of the present disclosure, the sleeve may have a cutout extending in the axial direction thereof, and the first detection section may have a configuration in which the intensity of light for optical detection is within such a range that it is detectable, where the cutout is present on an optical axis of the light, that the ferrule is inserted in the insertion hole and it is detectable, where the cutout is present in a direction orthogonal to the optical axis of the light, that the ferrule is not inserted in the insertion hole.

In the present disclosure, even where the cutout is present in the axial direction of the sleeve, the detection by the first detection section can be performed assuredly, since the intensity of the light for optical detection is within the above-mentioned range.

In the optical fiber adaptor according to the embodiment of the present disclosure, the sleeve may have a cutout extending in the axial direction thereof, and the optical fiber adaptor further includes a member which is provided on an optical path of the light for optical detection by the first detection section and which is formed from the same material as the sleeve.

In the present disclosure, even where the cutout is present in the axial direction of the sleeve, the dependency of the quantity of light transmitted for optical detection by the first detection section on the cutout can be reduced, since the member formed from the same material as the sleeve is provided in the above-mentioned manner.

In the optical fiber adaptor according to the embodiment of the present disclosure, the second detection section may include a cantilever which is bent by the lock nut mounted to the mounting section, and a sensor operable to detect the amount of deflection of the cantilever.

In the present disclosure, the cantilever and the sensor operable to detect the amount of deflection of the cantilever are used in combination as the second detection section, whereby the sensitivity of detection by the second detection section can be enhanced.

According to another embodiment of the present disclosure, there is provided a laser system which includes an optical fiber adaptor body, a light-transmitting sleeve, an output unit, and first and second detection sections.

The optical fiber adaptor body has an insertion hole in which to insert a ferrule of an optical fiber plug, and a mounting section to which to mount a lock nut of the optical fiber plug having the ferrule inserted in the insertion hole.

The light-transmitting sleeve is formed, for example, from zirconia, is provided in the insertion hole, and surrounds the ferrule inserted in the insertion hole.

The output unit outputs a laser beam to an optical fiber of the optical fiber plug through the insertion hole.

The first detection section optically detects, from the outer peripheral side of the sleeve, whether or not the ferrule of the optical fiber plug is inserted in the insertion hole.

The second detection section detects the position of the lock nut of the optical fiber plug mounted to the mounting section.

According to the present disclosure, other conditions than the mounted/demounted state of an optical fiber plug can be determined, and safety can be enhanced more than in the past.

Additional features and advantages are described herein, and will be apparent from the following Detailed Description and the figures.

BRIEF DESCRIPTION OF THE FIGURES

FIG. 1 is a sectional view showing the configuration of an optical fiber adaptor according to one embodiment of the present disclosure, in the condition where an optical fiber plug is not mounted.

DETAILED DESCRIPTION

Figure 2:
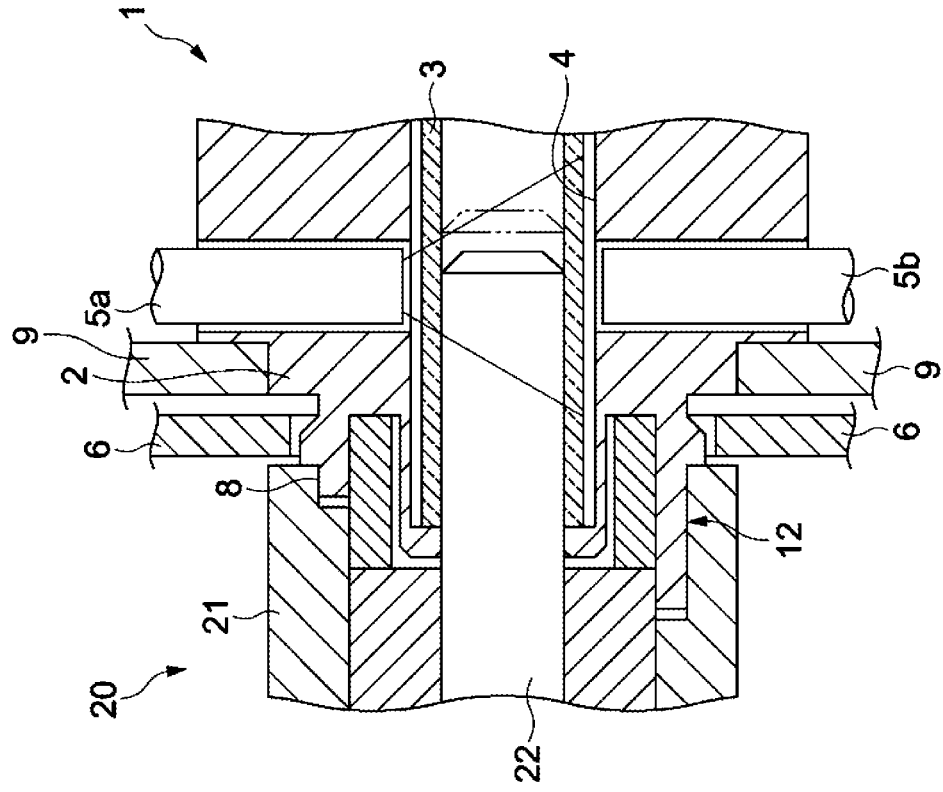
FIG. 2 is a sectional view showing the configuration of the optical fiber adaptor according to the one embodiment of the present disclosure, in the condition where the optical fiber plug is mounted.
Figure 3:
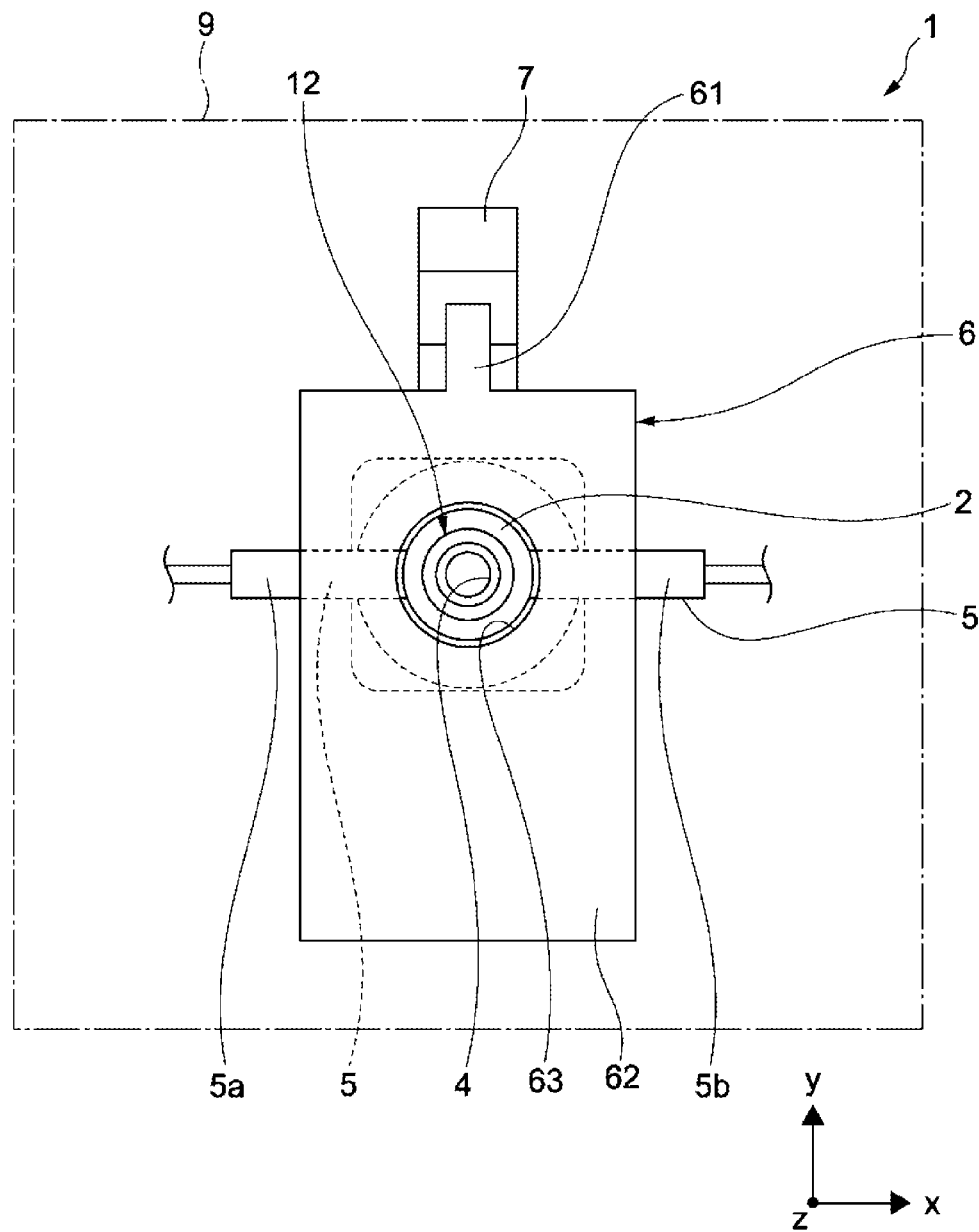
FIG. 3 is a front view of the optical fiber adaptor shown in FIG. 1.
Figure 4:
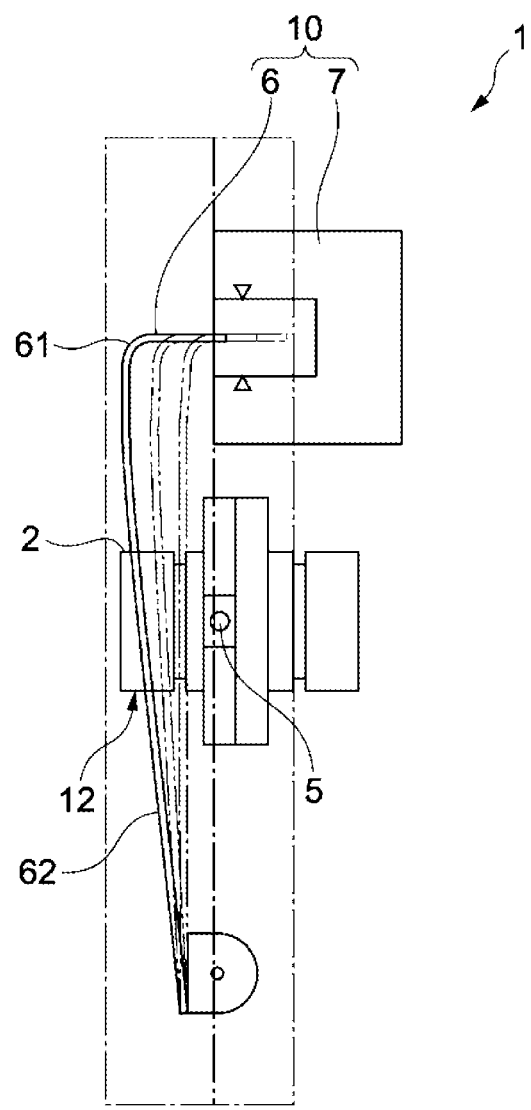
FIG. 4 is a side view of FIG. 3.

Embodiments of the present application will be described below in detail with reference to the drawings.

Now, embodiments of the present disclosure will be described below, referring to the drawings.

(Configuration of Optical Fiber Adaptor)

FIGS. 1 to 5 show the configuration of an FC-type optical fiber adaptor according to an embodiment of the present disclosure.

As shown in these figures, the optical fiber adaptor 1 includes a connector plate 9, an optical fiber adaptor body 2, a sleeve 3, a transmission-type fiber sensor 5 as a first detection section, and a second detection section 10. The second detection section 10 has a cantilever 6 and a photomicrosensor 7.

The optical fiber adaptor body 2 is disposed on the connector plate 9. The optical fiber adaptor body 2 has an insertion hole 4 in which to insert a ferrule 22 of an optical fiber plug 20, and a male screw-formed mounting section 8 on which to mount a lock nut 21 when the ferrule 22 is inserted in the insertion hole 4.

The sleeve 3 is provided in the insertion hole 4 in such a manner as to surround the ferrule 22 when the ferrule 22 is inserted in the insertion hole 4. The sleeve 3 has a hollow cylindrical shape, and is formed from a light-transmitting material, for example, zirconia.

The transmission-type fiber sensor 5 is a kind of optical proximity sensor, is disposed on the outside of the sleeve 3, and detects optically, from the outer peripheral side of the sleeve, whether or not the ferrule 22 is inserted in the insertion hole 4. The transmission-type fiber sensor 5 has an emitting section 5a and a detecting section 5b. The emitting section 5a and the detecting section 5b are disposed opposite to each other, with the sleeve 3 therebetween. In the present embodiment, as the transmission-type fiber sensor 5, FU-59 (trade name) made by Keyence Corporation was used.

The cantilever 6 is formed, for example, from stainless steel, and has a flat plate-like shape in which a projecting portion 61 is connected to one edge (one side) of a rectangular main body 62. The main body 62 is formed with a hole 63 slightly greater than the mounting section 8 (male screw) in diameter, and a ferrule insertion section 12 of the optical fiber adaptor 1 is disposed in the manner of passing through the hole 63. The tip of the projecting portion 61 is curved toward the photomicrosensor 7 side. One end of the cantilever 6 is fixed to the connector plate 9, on the side of an edge opposite to that edge of the main body 62 of the cantilever 6 at which the projecting portion 61 is disposed. This structure is so designed that when the lock nut 21 of the optical fiber plug 20 is fastened, the cantilever 6 is angularly displaced by the lock nut 21. In addition, the cantilever 6 is fitted with a flat plate-shaped leaf spring 11.

Figure 5:
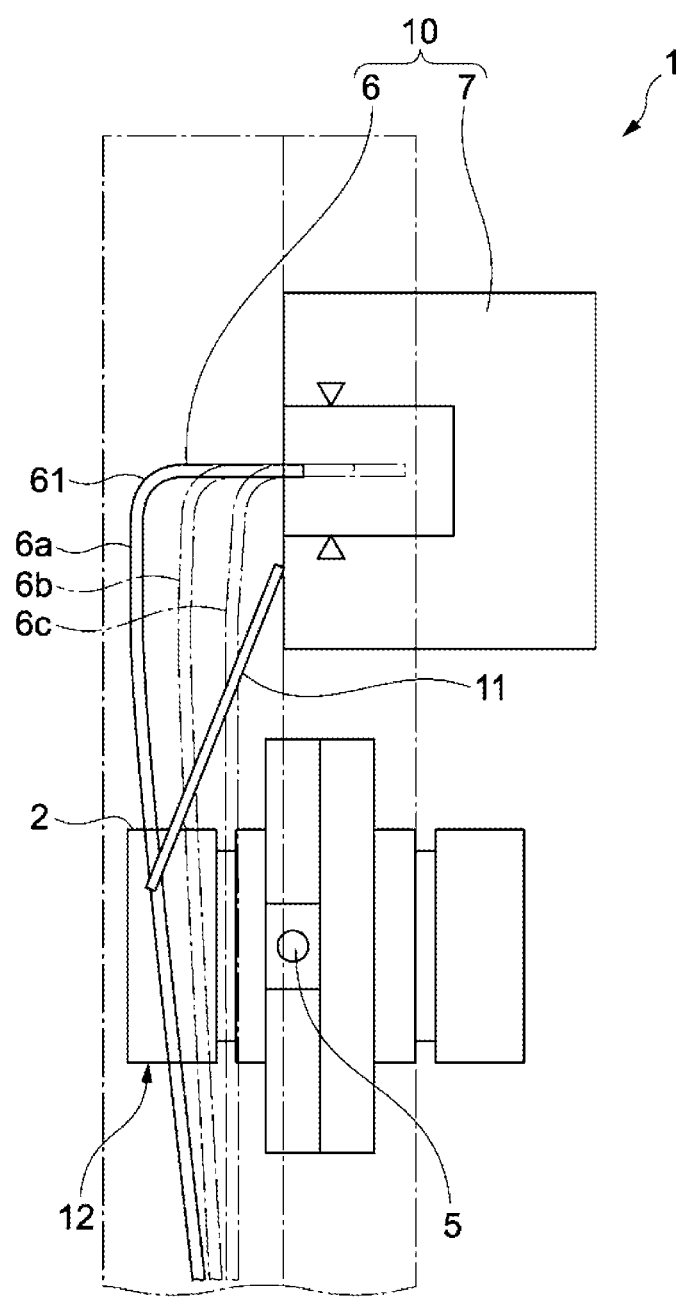
FIG. 5 is an enlarged sectional view of FIG. 4.

The cantilever 6 is bent in the insertion direction of the ferrule 22 by the lock nut 21 mounted to the mounting section 8 when the optical fiber plug 20 is inserted into the optical fiber adaptor 1. As shown in FIG. 5, in the case where the optical fiber plug 20 is not inserted, the cantilever 6 is positioned in a place of symbol 6a (initial position). During when the optical fiber plug 20 is inserted and the lock nut 21 is fastened, the cantilever 6 is bent, to be positioned in a place of symbol 6b. When fastening of the lock nut 21 is completed, the cantilever 6 has been further bent, to be positioned in a place of symbol 6c. The leaf spring 11 functions to push the cantilever 6, being moved by the insertion of the ferrule 22, back toward the initial position 6a where the cantilever 6 has been positioned before insertion of the ferrule 22; thus, the leaf spring 11 imparts elasticity to the cantilever 6.

The photomicrosensor 7 is a sensor which detects the amount of deflection (amount of displacement) of the cantilever 6 due to the insertion of the ferrule 22. By detecting the deflection of the cantilever 6 at the time of insertion of the optical fiber plug 20 by the microphotosensor 7, the position of the lock nut 21 mounted to the mounting section 8 can be detected. In the present embodiment, as the microphotosensor 7, EE-SX912-R (trade name) made by Omron Corporation was used.

Usually, the fastening amount of the lock nut is about 2 mm from the tip end of the screw, and this amount is insufficient for displacement detection. In the present embodiment, however, the use of the cantilever 6 makes it possible to substantially double the amount of displacement attendant on the fastening. Consequently, the sensitivity of detection is enhanced, and reliable detection can be achieved.

Commercial products of the above-mentioned sleeve 3 includes two types, namely, a type in which a cutout is formed along the axial direction and a type in which such a cutout is not formed. The sleeves 3 lacking the cutout are high-accuracy products for single-mode fibers. Many of the sleeves for multi-mode fibers are of the type in which the cutout is provided. Since the sleeve 3 can be rotated freely inside the optical fiber adaptor 1, the position of the cutout in the sleeve 3 is not fixed.

FIGS. 6A to 6H are views for illustrating the quantity of light transmitted (the quantity of light detected) in using of the transmission-type fiber sensor 5, in relation to the position of the cutout 3a in the sleeve 3. FIGS. 6A to 6D show the states when the ferrule is not inserted, while FIGS. 6E to 6H show the states when the ferrule is inserted.

Figure 6A:
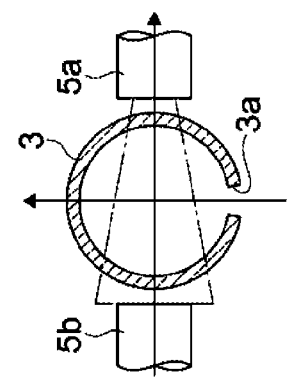
FIGS. 6A to 6H are views for illustrating the quantity of light transmitted which is detected by a fiber sensor in relation to the position of a cutout in a sleeve.
Figure 6B:
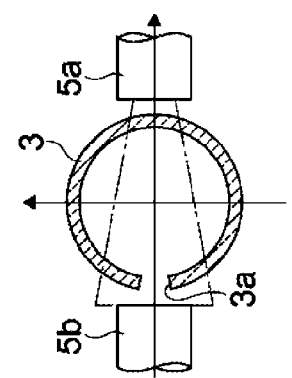
Figure 6C:
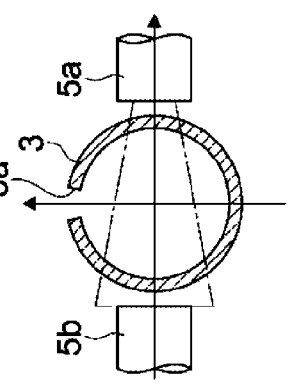
Figure 6D:
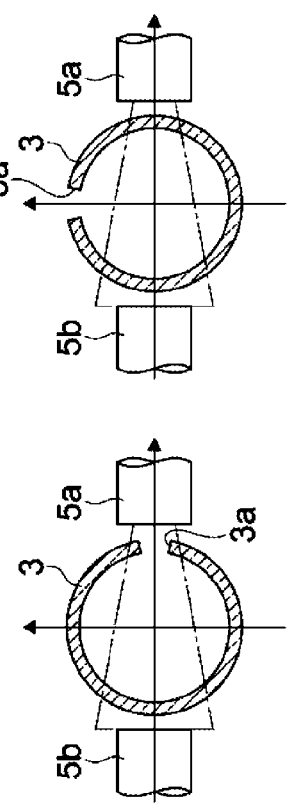
Figure 6E:
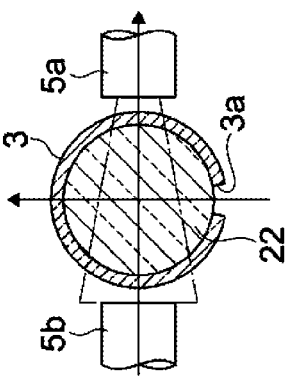
Figure 6F:
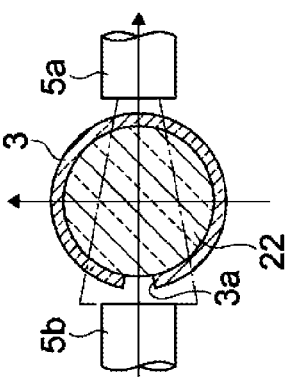
Figure 6G:
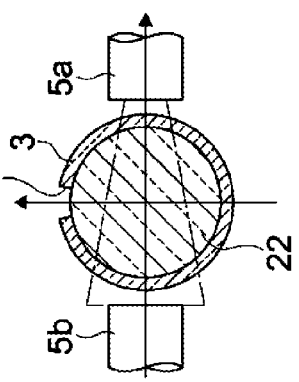
Figure 6H:
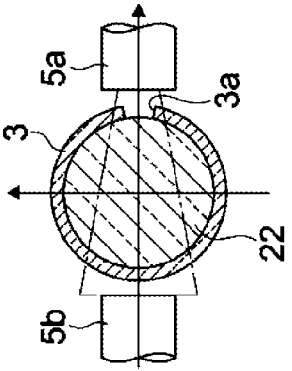
Figures 7, 8:
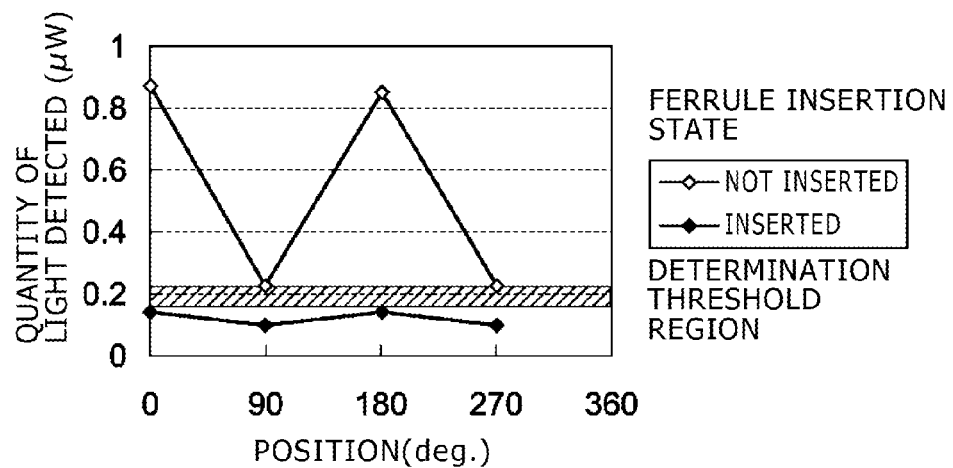
FIG. 7 is a table showing the determination of conditions by the results of ferrule insertion detection and lock nut fastening detection.
FIG. 8 is a graph showing indication values on the fiber sensor in relation to the position of the cutout in the sleeve.

FIG. 8 is a graph showing the quantity of light received by the transmission-type fiber sensor 5 in relation to the position of the cutout 3a in the sleeve 3, specifically, a plot of the quantity of light detected in the transmission-type fiber sensor 5 in the states of FIGS. 6A to 6H. In FIG. 8, the axis of abscissas represents the cutout position as viewed from the optical axis of the transmission-type fiber sensor 5. In FIGS. 6A and 6E, the cutout position as viewed from the optical axis of the transmission-type fiber sensor 5 is 0 deg. In FIGS. 6B and 6F, the cutout position as viewed from the optical axis of the fiber sensor 5 is 90 deg. In FIGS. 6C and 6G, the cutout position as viewed from the optical axis of the fiber sensor 5 is 180 deg. In FIGS. 6D and 6H, the cutout position as viewed from the optical axis of the fiber sensor 5 is 270 deg.

As shown in FIGS. 6A to 6H, where the sleeve 3 of the type having the cutout 3a is used, the positional relationship between the optical axis of the transmission-type fiber sensor 5 and the cutout 3a is generally classified into three states. The three states correspond respectively to a case where the cutout 3a is located on the light emission side of the transmission-type fiber sensor 5 (FIGS. 6A and 6E), a case where the cutout 3a is located on the light detection side of the transmission-type fiber sensor 5 (FIGS. 6C and 6G), and a case where the cutout 3a is located at a position perpendicular to the optical axis of the transmission-type fiber sensor 5 (FIGS. 6B, 6D, 6F and 6H).

A zirconia-made ferrule and a zirconia-made sleeve are ordinarily formed by sintering a zirconia powder, followed by polishing the sintered body, and therefore have a strong property of scattering light. Therefore, as shown in FIG. 8, the quantity of light detected in the transmission-type fiber sensor 5 when the ferrule is not inserted is greater in the case where the cutout 3a is located on the light detection side or the light emission side of the transmission-type fiber sensor 5, and smaller in the case where the cutout 3a is located at a position perpendicular to the optical axis of the fiber sensor 5. The reason is as follows. Assuming that the thickness of the sleeve is 0.35 mm, the total thickness of scattering material through which light is transmitted is 0.35 mm in the former case, and 0.70 mm in the latter case; thus, the total thickness in the latter case is double the total thickness in the former case. On the other hand, when the ferrule is inserted, as shown in FIG. 8, the quantity of light detected in the transmission-type fiber sensor 5 shows reduced dependence on the position of the cutout 3a, as compared with the dependence when the ferrule is not inserted. This is because the insertion of the ferrule results in that the ratio of the total thickness of scattering material (through which light is transmitted) in the case where the cutout 3a is located on the light detection side or the light emission side of the transmission-type fiber sensor 5 to the total thickness in the case where the cutout 3a is located at a position perpendicular to the optical axis of the fiber sensor 5 approaches 1 (one). For example, let the diameter of the ferrule be 2.50 mm and let the thickness of the sleeve be 0.35 mm, the total thickness of the scattering material through which light is transmitted is 2.85 mm in the case where the cutout 3a is located on the light detection side or the light emission side of the transmission-type fiber sensor 5. On the other hand, in the case where the cutout 3a is located at a position perpendicular to the optical axis of the transmission-type fiber sensor 5, the total thickness is 3.20 mm. Consequently, the ratio of the total thickness in the former case to the total thickness in the latter case is closer to 1 (one), as compared with the value of the ratio attained when the ferrule is not inserted.

As shown in FIG. 8, the minimum quantity of light detected when the ferrule is not inserted is sufficiently greater than the maximum quantity of light detected when the ferrule is inserted. Therefore, when the detected light quantity region indicated by hatching in the figure is set as a determination threshold region, detection of whether the ferrule is inserted or not can be performed reliably, independently of the position of the cutout 3a. In other words, the intensity of the light for optical detection by the transmission-type fiber sensor 5 is set within such a range that it is detectable, where the cutout 3a is present on the optical axis of the light, that the ferrule 22 is inserted in the insertion hole 4 and it is detectable, where the cutout 3a is present in a direction orthogonal to the optical axis of the light, that the ferrule 22 is not inserted in the insertion hole 4. Such a setting ensures that the detection by the transmission-type fiber sensor 5 can be carried out assuredly.

Figure 9:
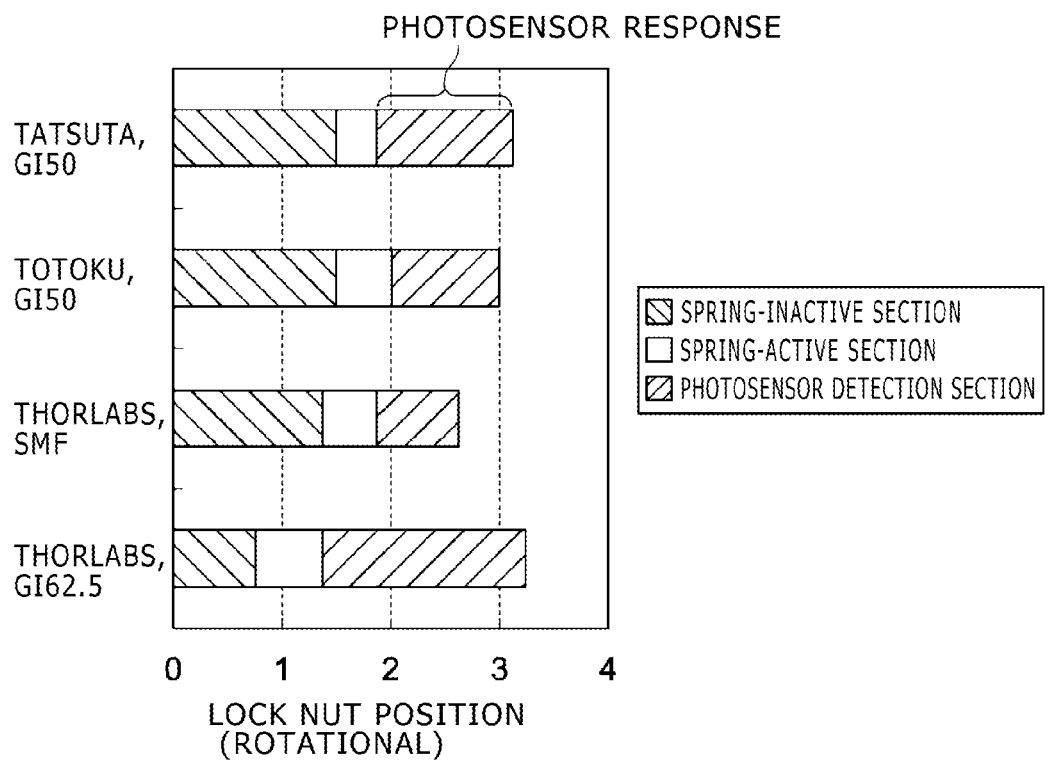
FIG. 9 is a graph showing the detection results of fastening of the lock nut relative to each of four kinds of FC-type optical fiber cables.

FIG. 9 is a graph showing the detection results of fastening of the lock nut relative to each of four kinds of FC (fibre channel)-type optical fiber cables detected by the second detection section 10. In this test, starting from the intermeshing state of the lock nut 21, the lock nut 21 is rotated, followed by measurement of three positions, namely, a position where rotational resistance by the spring 11 of the cantilever 6 is generated, a position where fastening is detected by the photomicrosensor 7, and a position where the lock nut 21 is fully fastened tight.

As shown in FIG. 9, in the cases of all the FC-type fiber cables, it was possible to securely detect the fastening.

In the present embodiment, as above-mentioned, the transmission-type fiber sensor is provided as the first detection section, whereby insertion of the ferrule 22 can be detected. Furthermore, the cantilever 6 and the photomicrosensor 7 are provided in combination as the second detection section, whereby fastening of the lock nut 21 of the optical fiber plug 20 can be detected.

(Method of Determining Conditions by Detection Sections)

Now, a method of determining states by use of the above-described optical fiber adaptor 1 will be described below.

The optical fiber adaptor 1 has both the ferrule insertion detection mechanism (first detection section) and the lock nut fastening detection mechanism (second detection section), whereby the four conditions shown in FIG. 7 can be distinguished.

As shown in FIG. 7, when it is detected by the first detection section (transmission-type fiber sensor 5) that the ferrule is not inserted and it is detected by the second detection section that the lock nut is not fastened tight, it can be determined that the plug is not inserted and the adaptor is exposed.

When it is detected by the first detection section that the ferrule 22 is inserted and it is detected by the second detection section 10 that the lock nut 21 is not fastened tight, it can be determined that insertion of the ferrule 22 is under way or cleaning of the optical fiber adaptor 1 is under way.

When it is detected by the first detection section that the ferrule 22 is not inserted and it is detected by the second detection section that the lock nut 21 is fastened tight, it can be determined that there exists a condition where the dust cover is mounted.

When it is detected by the first detection section that the ferrule 22 is inserted and it is detected by the second detection section that the lock nut 21 is fastened tight, it can be determined that the optical fiber plug 20 is in normal connection.

Therefore, according to the present embodiment, other conditions than the mounted/demounted state of the plug can also be determined, misconnection of optical fibers can be prevented, and safety can be enhanced more than in the past.

(Modification)

Figure 10:
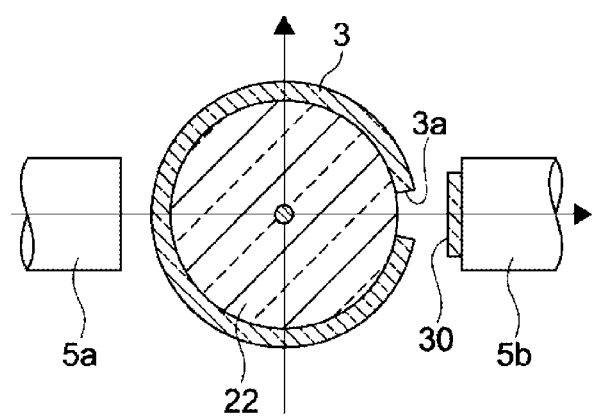
FIG. 10 is a view showing a modification of the present disclosure.

FIG. 10 is a modification of the optical fiber adaptor.

As shown in FIG. 10, in the case of using a sleeve 3 provided with a cutout 3a, a member 30 formed from the same material as the sleeve 3 may be provided on an optical path of the light for optical detection by a transmission-type fiber sensor 5. The provision of the member 30 formed from the same material as the sleeve 3 ensures that even in the case where the cutout 3a is located in the axial direction of the sleeve 3, the dependency of the quantity of light transmitted for optical detection by the transmission-type fiber sensor 5 on the cutout 3a can be reduced.

(Configuration of Laser System)

Figure 11:
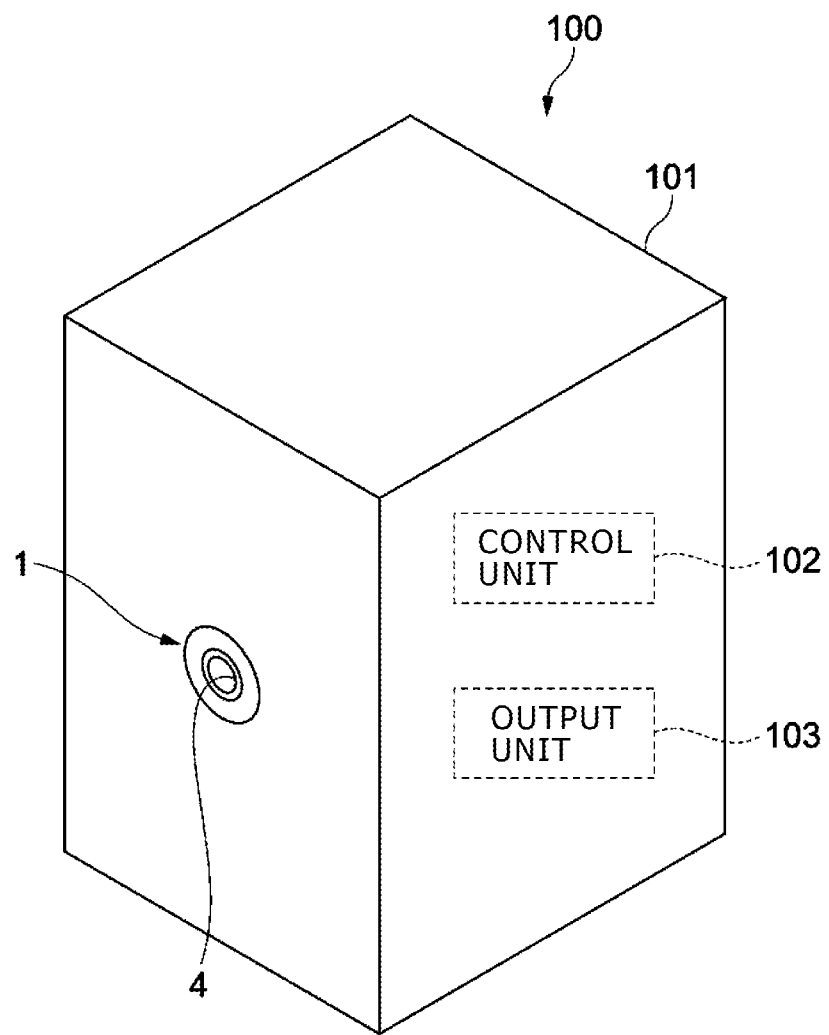
FIG. 11 is a schematic illustration of a laser system including the optical fiber adaptor according to an embodiment of the present disclosure.

FIG. 11 illustrates a laser system having the optical fiber adaptor shown in FIG. 1.

As shown in FIG. 11, the laser system 100 includes a housing 101, the optical fiber adaptor 1, a control unit 102, and an output unit 103.

The output unit 103 generates a laser beam. An optical fiber plug 20 can be mounted to and demounted from the optical fiber adaptor 1.

The control unit 102 is supplied with detection results from the first and second detection sections of the optical fiber adaptor 1. In the control unit 102, determination of conditions is performed based on the detection results in the above-mentioned manner, and the presence/absence of emission of the laser beam from the output unit 103 is controlled accordingly.

In the laser system 100 in which the optical fiber adaptor 1 having the two detection sections is incorporated as abovementioned, it is possible to prevent such damages due to unwilling laser radiation in a condition where a dust cover is mounted or in a condition where cleaning of the optical fiber adaptor 1 is under way from occurring. That is, for example, ignition or outgassing due to overheating of the cover or the cleaning implement can be avoided. Besides, even when one of the two detection sections has failed, erroneous emission of laser beam can be prevented by the other detection section. Thus, safety can be enhanced.

It should be understood that various changes and modifications to the presently preferred embodiments described herein will be apparent to those skilled in the art. Such changes and modifications can be made without departing from the spirit and scope and without diminishing its intended advantages. It is therefore intended that such changes and modifications be covered by the appended claims.

The application is claimed as follows:

1. An optical fiber adaptor comprising:
   an optical fiber adaptor body including an insertion hole in which to insert a ferrule of an optical fiber plug, and a mounting section to which to mount a lock nut of the optical fiber plug having the ferrule inserted in the insertion hole;
   a light-transmitting sleeve which is provided in the insertion hole and which surrounds the ferrule inserted in the insertion hole;
   a first detection section operable to optically detect, from an outer peripheral side of the sleeve, whether or not the ferrule is inserted in the insertion hole; and
   a second detection section operable to detect the position of the lock nut mounted to the mounting section.

2. The optical fiber adaptor according to claim 1,
   wherein the sleeve has a cutout extending in an axial direction thereof, and
   the first detection section has a configuration in which the intensity of light for optical detection is within such a range that it is detectable, where the cutout is present on an optical axis of the light, that the ferrule is inserted in the insertion hole and it is detectable, where the cutout is present in a direction orthogonal to the optical axis of the light, that the ferrule is not inserted in the insertion hole.

3. The optical fiber adaptor according to claim 1,
   wherein the sleeve has a cutout extending in an axial direction thereof, and the optical fiber adaptor further comprises
   a member which is provided on an optical path of light for optical detection by the first detection section and which is formed from the same material as the sleeve.

4. The optical fiber adaptor according to claim 1,
   wherein the second detection section includes a cantilever which is bent by the lock nut mounted to the mounting section, and a sensor operable to detect the amount of deflection of the cantilever.

5. A laser system comprising:
   an optical fiber adaptor body including an insertion hole in which to insert a ferrule of an optical fiber plug, and a mounting section to which to mount a lock nut of the optical fiber plug having the ferrule inserted in the insertion hole;
   a light-transmitting sleeve which is provided at the insertion hole and which surrounds the ferrule inserted in the insertion hole;
   an output unit operable to output a laser beam to an optical fiber of the optical fiber plug through the insertion hole;
   a first detection section operable to optically detect, from an outer peripheral side of the sleeve, whether or not the ferrule of the optical fiber plug is inserted in the insertion hole; and
   a second detection section operable to detect the position of the lock nut of the optical fiber plug mounted to the mounting section.

* * * * *